US012482955B1

(12) United States Patent
Casperson et al.

(10) Patent No.: US 12,482,955 B1
(45) Date of Patent: Nov. 25, 2025

(54) INTEGRATED ANTENNA SYSTEM WITH CORPORATE FEED NETWORK AND ANTENNA ARRAY

(71) Applicant: FIRST RF Corporation, Boulder, CO (US)

(72) Inventors: Andrew L. Casperson, Charleston, SC (US); Anthony J. Jensen, Thornton, CO (US)

(73) Assignee: FIRST RF Corporation, Boulder, CO (US)

( * ) Notice: Subject to any disclaimer, the term of this patent is extended or adjusted under 35 U.S.C. 154(b) by 524 days.

(21) Appl. No.: 17/982,180

(22) Filed: Nov. 7, 2022

(51) Int. Cl.
*H01Q 21/06* (2006.01)
*H01Q 5/371* (2015.01)
*H01Q 9/04* (2006.01)
*H01Q 21/22* (2006.01)

(52) U.S. Cl.
CPC .......... *H01Q 21/065* (2013.01); *H01Q 5/371* (2015.01); *H01Q 9/0421* (2013.01); *H01Q 21/22* (2013.01)

(58) Field of Classification Search
CPC .... H01Q 21/065; H01Q 5/371; H01Q 9/0421; H01Q 21/22
See application file for complete search history.

(56) References Cited

U.S. PATENT DOCUMENTS 2,762,045 A 9/1956 Stavis et al.
8,698,696 B1 4/2014 McCandless
2012/0169560 A1* 7/2012 Lee .......................... H01Q 9/30 343/770
2014/0198005 A1* 7/2014 Hnatiw ................ H01Q 21/005 29/600
2021/0167518 A1* 6/2021 Achour ................ H01Q 21/005
2022/0302597 A1* 9/2022 Timofeev ............... H01Q 21/06
2023/0031609 A1* 2/2023 Russo ................ H01Q 21/0075

FOREIGN PATENT DOCUMENTS

EP 2757635 A1 7/2014

* cited by examiner

*Primary Examiner* — Dameon E Levi
*Assistant Examiner* — Michael M Bouizza
(74) *Attorney, Agent, or Firm* — COZEN O'CONNOR

(57) ABSTRACT

An integrated antenna system includes a first patch, a second patch, and internal patches comprising electrically conductive material. Each of these patches has a radiator sub-patch and a feed-network sub-patch. The radiator sub-patches of the internal patches are located between the radiator sub-patches of the first and second patches to form an array of tapered-slot antenna elements. The radiator sub-patch of each internal patch tightly couples a neighboring pair of the antenna elements. The first patch, second patch, and internal patches are electrically isolated from each other. The feed-network sub-patches of the first and second patches are positioned to form an initial gap and cooperate with the initial gap to create a transmission line. The feed-network sub-patches of the first patch, second patch, and internal patches further form a corporate feed network that is fed by the transmission line and feeds the array of tapered-slot antenna elements.

32 Claims, 13 Drawing Sheets

INTEGRATED ANTENNA SYSTEM WITH CORPORATE FEED NETWORK AND ANTENNA ARRAY

BACKGROUND

In a conventional antenna array, neighboring elements are typically separated by one-half of the wavelength of the highest operating frequency. This spacing minimizes mutual coupling between the elements at the highest operating frequency, but can result in strong mutual coupling at lower operating frequencies that limit the array performance. On the other hand, a tightly-coupled antenna array has neighboring elements that are intentionally placed closer to each other to increase their mutual coupling. In addition to occupying less volume than a conventional antenna array, the tightly-coupled antenna array can radiate at lower frequencies, thereby increasing bandwidth. Even stronger coupling between neighboring elements can be introduced with capacitors or direct electrical connections.

SUMMARY

The present embodiments include an integrated antenna system that combines a corporate power splitter with a tightly-coupled antenna array. The antenna system is constructed from planar patches that are made from an electrically conductive material, such as metal. The patches are shaped and positioned relative to each other to create planar transmission lines and splitters that form the corporate power splitter. The antenna system is "integrated" in that the same patches are also shaped to create the radiating elements of the tightly coupled antenna array.

The antenna system may use any type of planar transmission-line technology, or a combination of such technologies, and therefore can be easily constructed using circuit-board fabrication techniques known in the art. For example, the patches can be positioned to create electrically-insulating gaps therebetween. Such gaps, in conjunction with the patches, create slotline-based transmission lines and splitters. In this example, all of the patches may be co-planar, i.e., fabricated on the same layer of a circuit board. Alternatively, some of the patches can be placed on different layers of the circuit board to create, for example, antipodal or bilateral slotline-based transmission lines. Other types of planar transmission lines may be used (e.g., microstrip, coplanar waveguide, finline, etc.).

In some embodiments, each antenna element is a tapered-slot antenna element formed by an electrically-insulating tapered slot that is bound on its sides by electrically conductive patches. Each antenna element may be linearly tapered or non-linearly tapered. In one example of non-linear tapering, the tapered slot is exponentially tapered, in which case the antenna elements is a Vivaldi antenna. Each antenna element is directly fed by a respective transmission line of the corporate feed network.

Some patches are used to define edges of neighboring antenna elements. These patches are referred to herein as "internal patches". For example, an internal patch defines both (1) the right edge of the tapered-slot antenna element to its left and (2) the left edge of the tapered-slot antenna element to its right. Since the internal patch is made from electrically conductive material, it provides a direct electrical connection between these neighboring antenna elements. This direct electrical connection or tightly couples the neighboring antenna elements. Additional internal patches are used to tightly couple all of the neighboring antenna elements, thereby making the entire array tightly coupling.

In some embodiments, the integrated antenna system has two antenna arrays that are fed by two corporate feed networks. The two corporate feed networks start at opposing first and second ends of a transmission-line segment that is excited by a coupler. The two antenna arrays may emit in opposing directions (e.g., in the forward and backward directions in FIG. 18). In other embodiments, the integrated antenna system has only one antenna array and corporate feed network. In these embodiments, a cavity stub may be placed near the second end of the transmission-line segment such that all of the power of the coupled signal flows into the corporate feed network at the first end of the transmission-line segment.

The size, shape, and characteristics of the integrated antenna systems described herein allow for a planar antenna (e.g., blade antenna) that provides the aerodynamic benefits of placing the antenna on the fuselage or other airplane component, while at the same time as getting an exceptionally circular azimuthal gain pattern.

Due to its flat shape, any integrated antenna system described herein may be used to construct a blade antenna system for an aircraft (e.g., airplane, helicopter, unmanned aerial vehicle, etc.). Advantageously, such a blade antenna system combines the aerodynamic benefits of conventional blade antennas with an azimuthal gain pattern that is exceptionally circular. Accordingly, the present embodiments offer better coverage than many conventional blade antennas known in the art, especially on the horizon.

Specifically, the integrated antenna system can fit inside a blade-shaped radome that extends away from the aircraft's body such that the radome is streamlined during forward motion of the aircraft. As such, this blade-shaped radome may be thought of as a fairing or fin that extends away from the aircraft's fuselage (e.g., upward from the top of the fuselage, as shown in FIG. 18) and has a smooth outline to reduce drag. In this case, when the antenna arrays are oriented to radiate in the forward and backward directions, the blade antenna system has an azimuthal gain profile that is exceptionally circular, especially at lower frequencies. In terms of elevation angle, the gain profile is peaked along the horizon and small elevation angles (both positive and negative). Thus, the blade antenna is particularly useful for communicating with other aircraft on the horizon (i.e., the other aircraft that are not directly above or below the blade antenna system). The blade antenna system is also useful for communicating with ground-based antennas near the horizon (i.e., that are not directly underneath the aircraft).

In embodiments, an integrated antenna system includes a first patch, a second patch, and one or more internal patches comprising electrically conductive material. The first patch, second patch, and one or more internal patches each have a radiator sub-patch and a feed-network sub-patch. The one or more radiator sub-patches of the one or more internal patches are located between the radiator sub-patches of the first and second patches to form an array of tapered-slot antenna elements. The radiator sub-patch of each internal patch tightly couples a neighboring pair of the tapered-slot antenna elements. The first patch, second patch, and one or more internal patches are electrically isolated from each other. The radiator sub-patches of the first patch, second patch, and one or more internal patches have no spatial overlap. The feed-network sub-patches of the first and second patches are positioned to form an initial gap therebetween and cooperate with the initial gap to create an initial transmission line. The feed-network sub-patches of the first patch, second patch, and one or more internal patches further form a corporate feed network that is fed by the initial transmission line and feeds the array of tapered-slot antenna elements.

DETAILED DESCRIPTION

Figure 1:
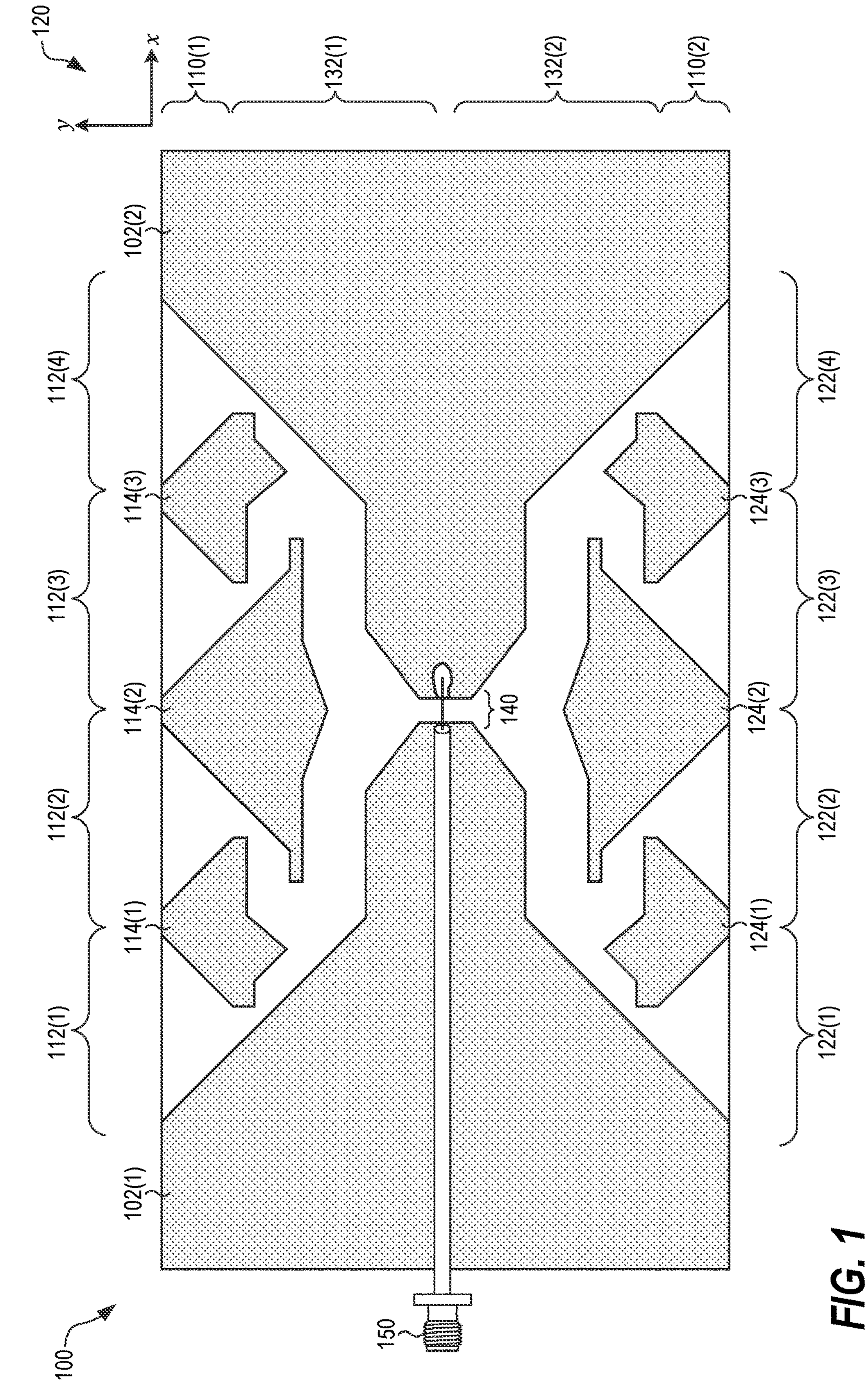
FIG. 1 is a side view of an integrated antenna system that functions as both a corporate feed network and an antenna array, in an embodiment.

FIG. 1 is a side view of an integrated antenna system 100 that functions as both a corporate feed network and an antenna array. The antenna system 100 includes a first patch 102(1), a second patch 102(2), a first plurality of one or more internal patches 114 located between the patches 102(1) and 102(2), and a second plurality of one or more internal patches 124 located between the patches 102(1) and 102(2). In the example of FIG. 1, the first plurality of internal patches includes a first internal patch 114(1), a second internal patch 114(2), and a third internal patch 114(3). Similarly, the second plurality of internal patches includes a first internal patch 124(1), a second internal patch 124(2), and a third internal patch 124(3). However, it will be apparent from other examples disclosed herein that the antenna system 100 may have a different numbers of internal patches 114 and 124 without departing from the scope hereof.

The term "patch" is used herein to refer to a piece of electrically conductive material that extends primarily in a plane. For clarity herein, each patch is assumed to lie flat in the x-y plane of a right-handed coordinate system 120. The thickness of the patch in the third dimension (i.e., along the z axis) is much smaller than the spatial extent of the patch in the other two dimensions. Examples of the electrically conductive material include, but are not limited to, metal (e.g., copper, aluminum, silver, nickel, gold, etc.) and electrically-conductive silicon.

Each patch is spatially bounded in the x-y plane by a plurality of edges. In the example of FIG. 1, all of the edges bounding each patch are straight. In this case, each patch has a rectilinear shape. However, a patch may have one or more curved edges or a combination or straight and curved edges. While each patch is shown devoid of holes, each patch may form one or more holes (e.g., to save material or weight). It will be apparent to those trained in the art where such holes could be located without significantly impacting the functionality of the antenna system 100. It will also be apparent to those trained in the art that each patch may have some curvature to it with minimal, if any, impact on the functionality of the antenna system 100. Thus, it is not necessary that each patch lie perfectly flat in the x-y plane. In FIG. 1, the internal patches are shown not extending any further than the extent of the first and second patches along y. However, in some embodiments, at least some of each internal patch may extend, either partially or wholly, past the extent of the first and second patches, either in the +y direction or the −y direction.

The patches 102, 114, and 124 are spaced adjacent to each other in the x-y plane to form gaps or slots therebetween. For clarity in the figures, gaps are solid white while patches are shaded. Each gap forms part of a planar transmission line or tapered-slot antenna element (see FIG. 2) and may be filled with a dielectric material, such as a glass-reinforced epoxy laminate (e.g., FR-4, G-10, etc.) or a crystalline or polycrystalline substrate. Alternatively, each gap may be devoid of any solid material (e.g., filled with air or another type of gas, under vacuum, etc.). When the patches are formed from metal, the antenna system 100 may be constructed as a printed circuit board (PCB) using standard PCB fabrication techniques.

FIG. 1 shows how some gaps form antenna elements. Each of these gaps is referred to herein as a "tapered slot". Specifically, the antenna system 100 has four tapered-slot antenna elements 112(1)-112(4) that form a first antenna array 110(1) and four tapered-slot antenna elements 122(1)-122(4) that form a second antenna array 110(2). Each remaining gap either forms part of a planar transmission line, in which case it is referred to herein as a transmission-line gap, or a splitter, in which case it is referred to herein as a splitter gap. These planar transmission lines and splitters collectively form a first corporate feed network 132(1) that feeds the first antenna array 110(1) and a second corporate feed network 132(2) that feeds the second antenna array 110(2). The corporate feed networks 132(1) and 132(2) share an initial transmission line 140 that is excited by a feed 150.

For clarity in the following discussion, each planar transmission line is a slotline transmission line (or simply "slotline"). However, those trained in the art will recognize that any planar transmission line described herein can be implemented with a different type of planar transmission-line technology (e.g., microstrip, stripline, coplanar waveguide, finline, etc.). In some embodiments, the integrated antenna system 100 includes more than one type of planar transmission line. In these embodiments, the integrated antenna system 100 may be constructed with couplers that convert electromagnetic signals between two different types of planar transmission lines (e.g., a microstrip-to-stripline coupler).

Figure 2:
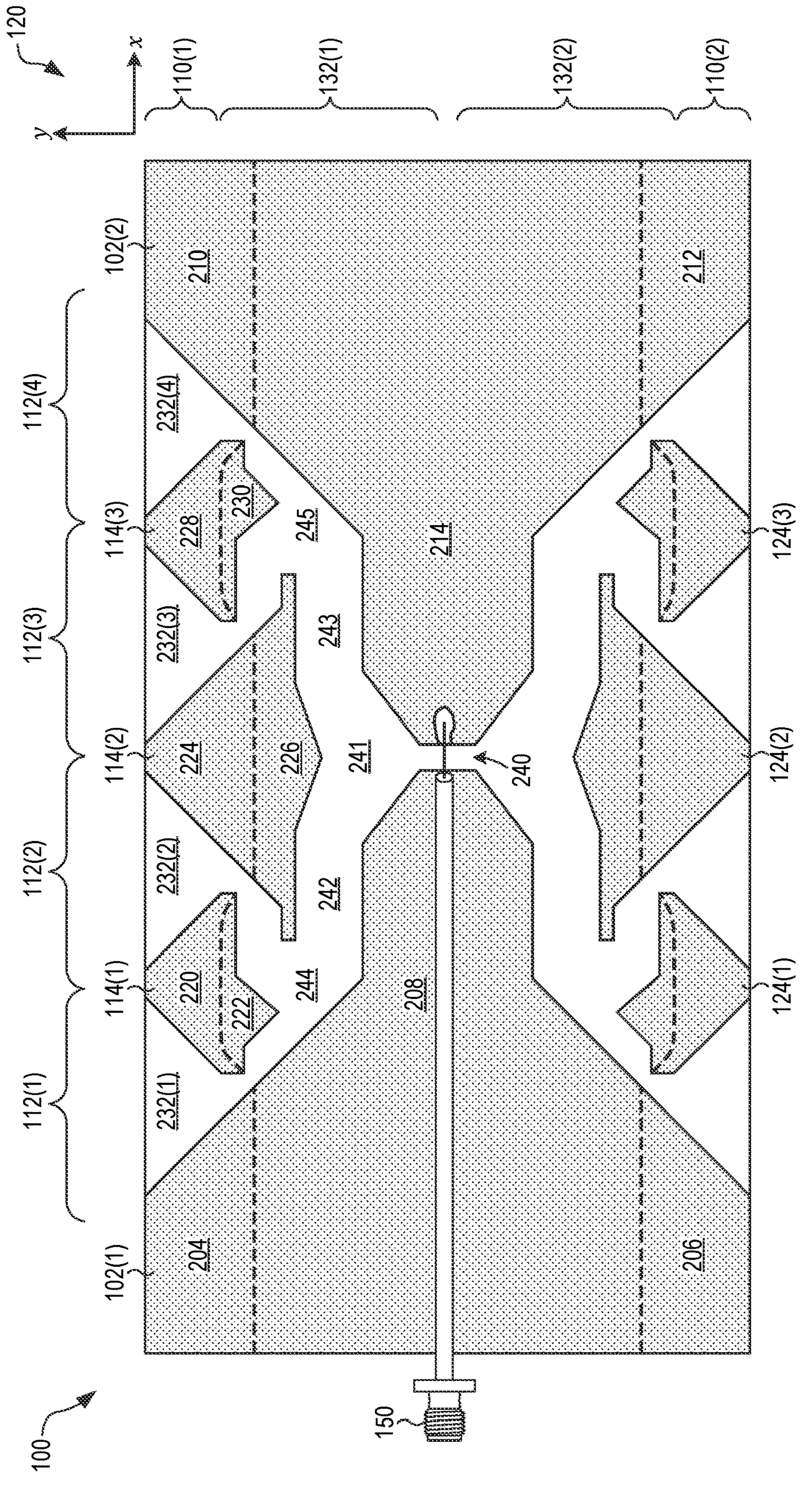
FIG. 2 is a side view of the integrated antenna system of FIG. 1 that shows how patches of the integrated antenna system can be partitioned into sub-patches.

FIG. 2 is a side view of the integrated antenna system 100 of FIG. 1 that shows how each of the patches 102, 114, and 124 can be partitioned into sub-patches. The first patch 102(1) includes radiator sub-patches 204 and 206 and a feed-network sub-patch 208. Similarly, the second patch 102(2) includes radiator sub-patches 210 and 212 and a feed-network sub-patch 214. The internal patch 114(1) includes a radiator sub-patch 220 and a feed-network sub-patch 222, the internal patch 114(2) includes a radiator sub-patch 224 and a feed-network sub-patch 226, and the internal patch 114(3) includes a radiator sub-patch 228 and a feed-network sub-patch 230. Each of the internal patches 124 can also be partitioned into a radiator sub-patch and a feed-network sub-patch, although these sub-patches are not labeled in FIG. 2. The patches 102, 114, and 124 can be partitioned into additional or alternative sub-patches than shown in FIG. 2 without departing from the scope hereof.

Within each patch, each sub-patch is bound by a plurality of edges and shares at least one of these edges with another sub-patch of the patch. A patch may be formed from physically distinct sub-patches that are electrically connected to each other (e.g., with solder, electrically-conductive epoxy, one or more vias, etc.). Alternatively, a patch may be formed from a single integral piece of material (e.g., a single metal sheet), in which case it may have sub-patches bounded by internal edges that are not physical. For clarity in FIG. 2, these internal edges are indicated by dashed lines.

Feed-network sub-patches are shaped and positioned to both define transmission-line gaps and splitter gaps. The feed-network sub-patches cooperate with these transmission-line gaps to create the planar transmission lines of the corporate feed networks 132(1) and 132(2). Similarly, the feed-network sub-patches cooperate with the splitter gaps to create the splitters of the corporate feed networks 132(1) and 132(2). Examples of transmission-line gaps and splitter gaps are shown in FIG. 2 (e.g., see gaps 240-245). For clarity, not all of the transmission-line gaps and splitter gaps in FIG. 2 are labeled.

Each neighboring pair of radiator sub-patches defines a tapered slot therebetween and cooperates with the tapered slot to form one of the tapered-slot antenna elements. For example, the radiator sub-patches 204 and 220 both define and cooperate with a first tapered slot 232(1) to create the first tapered-slot antenna element 112(1). Similarly, the radiator sub-patches 220 and 224 both define and cooperate with a second tapered slot 232(2) to create the second tapered-slot antenna element 112(2). In FIG. 2, the radiator sub-patches 220, 224, and 228 are equally spaced along x between the radiator sub-patches 204 and 210. In this case, the antenna elements 112(1)-112(4) are similarly sized and shaped and therefore have similar bandwidths. In other embodiments, the antenna elements 112(1)-112(4) are not equally sized and shaped. In these embodiments, the radiator sub-patches 220, 224, and 228 may be unequally spaced along x.

In FIGS. 1 and 2, the two radiator sub-patches that define the tapered slot of a single antenna element have no spatial overlap. If these two radiator sub-patches were co-planar (e.g., located on the same layer of a circuit board), they would be electrically shorted to each other if there was spatial overlap. However, in general it is not necessary that all of the patches be co-planar. For example, the radiator sub-patches 204 and 220 could be parallel to each other and located on different layers of the circuit board such that the first tapered-gap antenna element 112(1) is antipodal. In this case, the radiator sub-patches 204 and 220 have no spatial overlap when projected onto the same x-y plane. By extension, each radiator sub-patch of the integrated antenna system 100 has no spatial overlap with all of the other radiator sub-patches.

Also in FIGS. 1 and 2, two neighboring feed-network sub-patches are co-planar and have no spatial overlap, as is common for standard slotline-based transmission lines. Again, it is not necessary that all of the patches be co-planar. For example, the two feed-network sub-patches 208 and 214 could be parallel and located on different layers of the circuit board such that the initial transmission line 140 is antipodal. In this case, there will be some spatial overlap between the sub-patches 208 and 214 (i.e., the sub-patches 208 and 214 would overlap if projected onto the same x-y plane). Thus, while the embodiment shown in FIGS. 1 and 2 has no spatial overlap between any pair of feed-network sub-patches, other embodiments may have some spatial overlap between one or more neighboring pairs of feed-network sub-patches, provided that these sub-patches are not co-planar.

Figure 3:
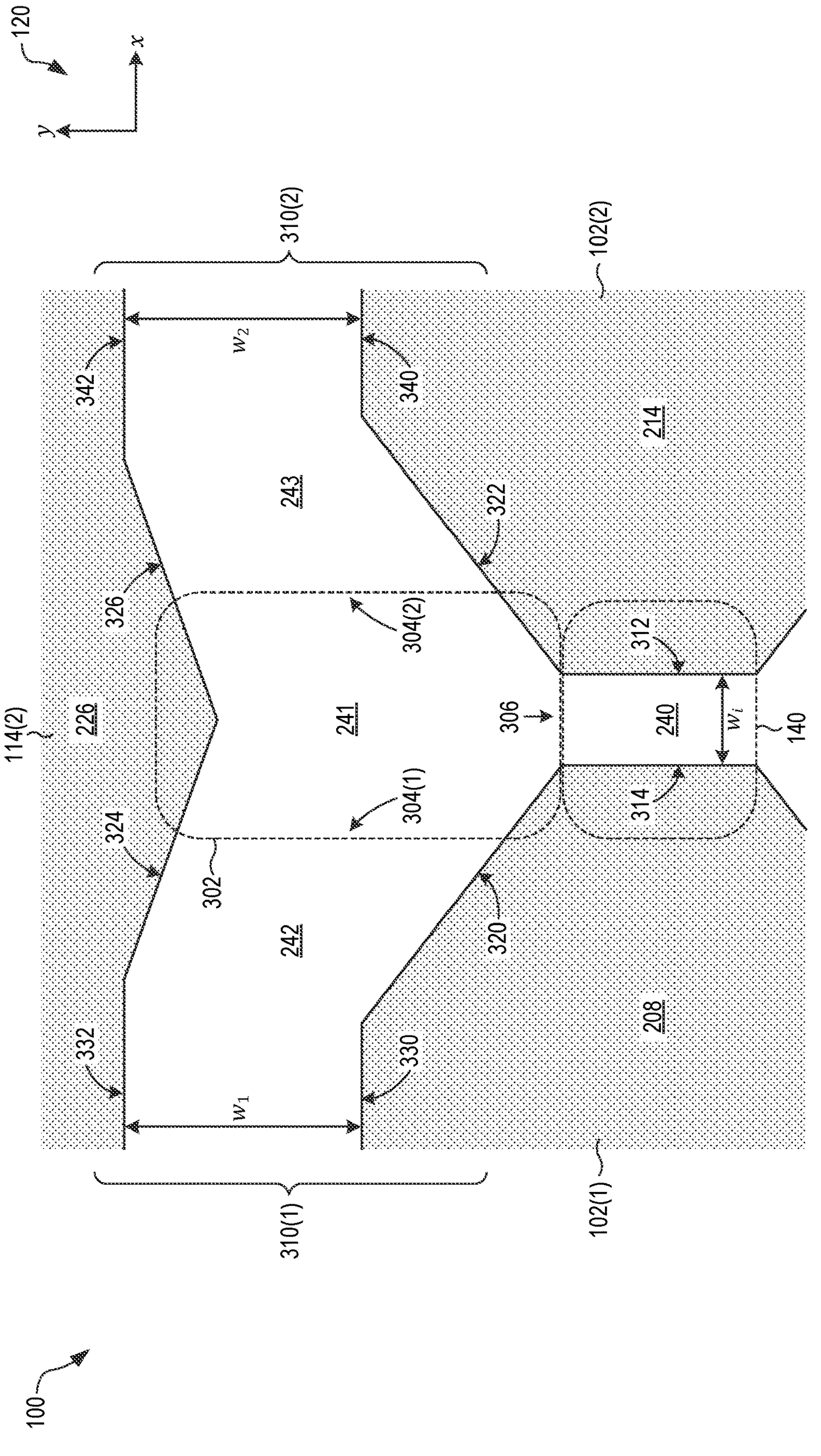
FIG. 3 is an expanded view of a center region of the integrated antenna system of FIG. 1.

FIG. 3 is an expanded view of a center region of the integrated antenna system 100 of FIG. 1. The feed-network sub-patch 208 of the first patch 102(1) is bounded in part by edges 314, 320, and 330. The feed-network sub-patch 214 of the second patch 102(2) is bounded in part by edges 312, 322, and 340. The feed-network sub-patch 226 of the internal patch 114(2) is bounded in part by edges 324, 326, 332, and 342. For clarity in FIG. 3, the feed 150 is not shown.

The edges 314 and 312 are parallel to each other and perpendicularly displaced from each other (i.e., along x) to form an initial transmission-line gap 240 therebetween. Portions of the sub-patches 208 and 214 near the respective edges 314 and 312 cooperate with the transmission-line gap 240 to form the initial transmission line 140, which extends parallel to the y axis. Thus, waves can propagate along the transmission line 140 in the ±y directions. The transmission-line gap 240 has an initial width $w_i$ that partly determines an initial characteristic impedance $Z_i(w_i)$ of the transmission line 140. Thus, the width $w_i$ may be selected such that the impedance $Z_i(w_i)$ matches the impedance of the feed 150.

FIG. 3 also illustrates how portions of the edges 320, 322, 324, and 326 form a first splitter gap 241 therebetween. The first splitter gap 241 cooperates with a portion of the sub-patch 208 near the edge 320, a portion of the sub-patch 214 near the edge 322, and a portion of the sub-patch 226 near the edges 324 and 326 to form a first splitter 302 that splits the initial transmission line 140 into a first transmission line 310(1) and a second transmission line 310(2). The splitter gap 241 is continuous with the initial gap 240, and the region of the first splitter 302 where the gaps 241 and 240 meet functions as an input port 306 of the first splitter 302.

The first splitter 302 may also be referred to as a "planar splitter" when it is constructed using planar transmission-line technology. For example, in FIG. 3 the first splitter 302 is a slotline-based splitter.

The edges 320, 324, 330, and 332 form a first transmission-line gap 242 therebetween that is continuous with the first splitter gap 241. Portions of the sub-patches 208 and 226 near these edges cooperate with the first transmission-line gap 242 to form the first transmission line 310(1), which extends primarily along x. For clarity, only a portion of the transmission line 310(1) is shown in FIG. 3. The region of the first splitter 302 where the gaps 241 and 242 meet functions as a first output port 304(1) of the splitter 302. Near the first output port 304(1), the transmission-line gap 242 has a width between the edges 320 and 324 that tapers down when moving away from the splitter 302. Between the edges 330 and 332, the transmission-line gap 242 has a width $w_1$ that is constant along x. Where the transmission-line gap 242 is tapered, the transmission line 310(1) acts like a transformer that changes impedance. Where the transmission-line gap 242 is not tapered, the transmission line 310(1) has a characteristic impedance $Z_1$ determined in part by the width $w_1$.

Similarly, the edges 322, 326, 340, and 342 form a second transmission-line gap 243 therebetween that is continuous with the first splitter gap 241. Portions of the sub-patches 214 and 226 near these edges cooperate with the transmission-line gap 243 to form the second transmission line 310(2), which extends primarily along x. For clarity, only a portion of the transmission line 310(2) is shown in FIG. 3. The region of the first splitter 302 where the gaps 241 and 243 meet acts as a second output port 304(2) of the splitter 302. Near the second output port 304(2), the transmission-line gap 243 has a width between the edges 322 and 326 that tapers down when moving away from the splitter 302. Between the edges 340 and 342, the transmission-line gap 243 has a width $w_2$ that is constant along x. Where the transmission-line gap 243 is tapered, the transmission line 310(2) acts like a transformer that changes impedance. Where the transmission-line gap 243 is not tapered, the transmission line 310(2) has a characteristic impedance $Z_2$ determined in part by the width $w_2$.

For the first splitter 302 to impedance-match the transmission lines 310(1) and 310(2) to the initial transmission line 140, the widths $w_1$ and $w_2$ may be selected such that $1/Z_i=1/Z_1(w_1)+1/Z_2(w_2)$. In FIG. 3, $w_1=w_2$ and therefore $Z_1=Z_2=2Z_i$. In this case, the splitter 302 is a 50/50 splitter, i.e., it splits the input power of an electromagnetic wave at the input port 306 equally between the output ports 304(1) and 304(2). In other embodiments, $w_1 \neq w_2$, in which case the splitter 302 splits the input power unequally between the output ports 304(1) and 304(2). The first splitter 302 may have a different geometry than shown in FIG. 3, as known by those trained in the art. For example, the first splitter 302 may be T-shaped by making the edges 324, 326, 332, and 342 colinear. In this case, the edges 320 and 322 may need to be moved to different positions than shown in FIG. 3 to ensure good impedance matching. Furthermore, the edges 330 and 314 can intersect at a right angle, thereby eliminating the edge 320. Similarly, the edges 312 and 340 can intersect at a right angle, thereby eliminating the edge 322.

Figure 4:
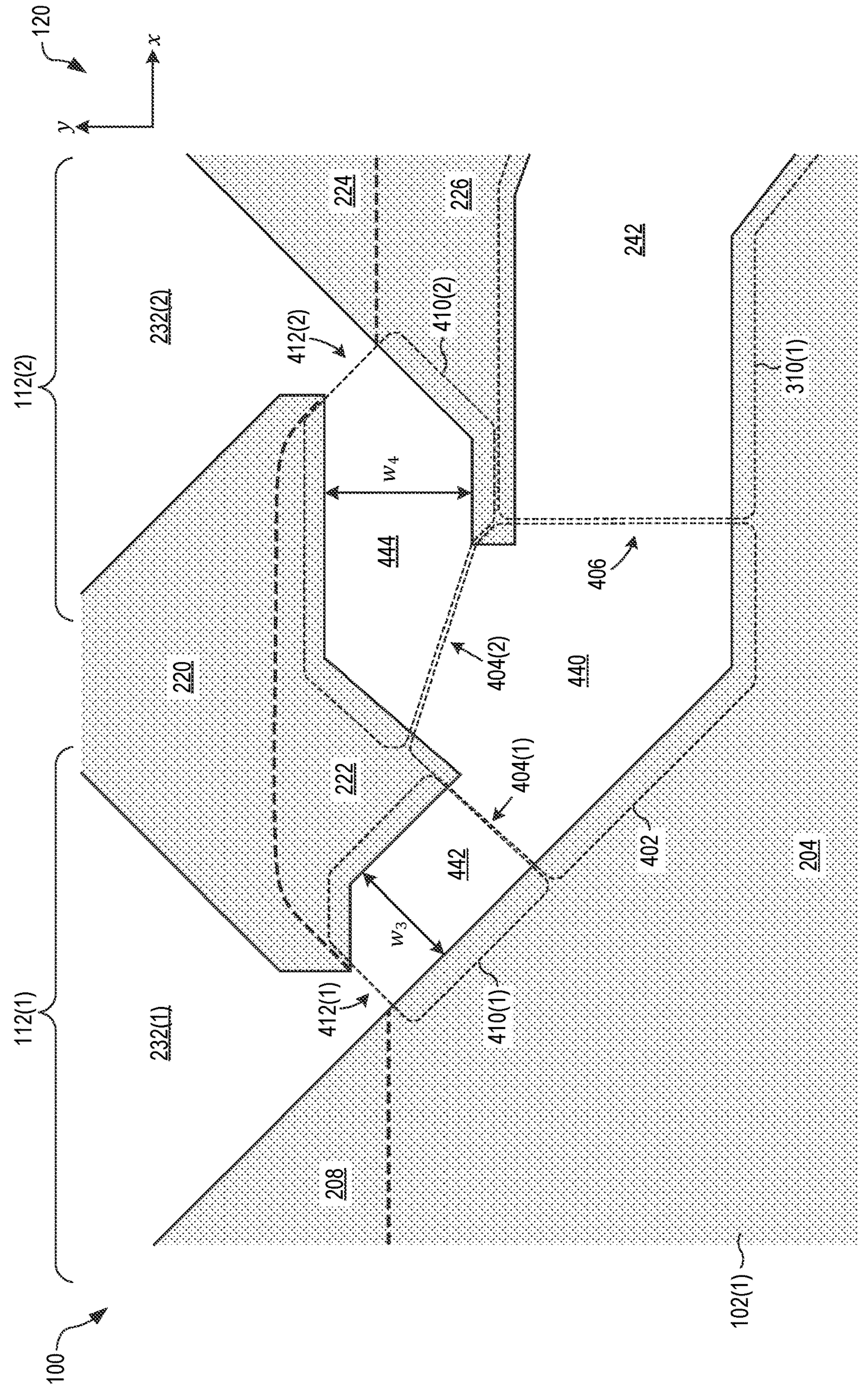
FIG. 4 is an expanded view of the integrated antenna system of FIG. 1 that illustrates how portions of sub-patches form a splitter gap therebetween.

FIG. 4 is an expanded view of the integrated antenna system 100 of FIG. 1 that illustrates how portions of the sub-patches 204, 222, and 226 form a second splitter gap 440 therebetween that is continuous with the first transmission-line gap 242. These portions of the sub-patches 204, 222, and 226 cooperate with the splitter gap 440 to form a second splitter 402 that splits the first transmission line 310(1) into a third transmission line 410(1) and a fourth transmission line 410(2). The region of the splitter 402 where the gaps 440 and 242 meet functions as an input port 406 of the splitter 402. Like the first splitter 302 of FIG. 3, the second splitter 402 may also be referred to as a "planar splitter" when it is constructed using planar transmission-line technology (e.g., slotline).

Other portions of the sub-patches 204 and 222 form a third transmission-line gap 442 therebetween that is continuous with the second splitter gap 440. These portions of the sub-patches 204 and 222 cooperate with the transmission-line gap 442 to form the third transmission line 410(1). The region of the splitter 402 where the gaps 442 and 440 meet functions as a first output port of the splitter 402. The gap 442 has a width $w_3$ that is constant along most of its length and determines in part the characteristic impedance of the transmission line 410(1). Near the end of the transmission line 410(1) (i.e., opposite to where the transmission line meets the splitter 402), the gap 442 tapers down to a width less than $w_3$ for impedance-matching the transmission line 410(1) to the first tapered-slot antenna element 112(1). However, another type of impedance matching may be used without departing from the scope hereof.

Other portions of the sub-patches 222 and 226 form a fourth transmission-line gap 444 therebetween that is continuous with the second splitter gap 440. These portions of the sub-patches 222 and 226 cooperate with the transmission-line gap 444 to form the fourth transmission line 410(2). The region of the splitter 402 where the gaps 444 and 440 meet functions as a second output port of the splitter 402. The gap 444 has a width $w_4$ that determines in part the characteristic impedance of the transmission line 410(2). Like the transmission line 410(1), the gap 444 tapers down to a width less than $w_4$ for impedance-matching the transmission line 410(2) to the second tapered-slot antenna element 112(2).

In FIGS. 3 and 4, the transmission lines and splitters are indicated with thin dashed lines. Since the antenna system 100 is integrated, it should therefore be understood by those trained in the art that the locations of the thin dashed lines in FIGS. 3 and 4 are only approximate and the transmission line and splitter may "begin" and "end" in other locations than shown.

The region of the first tapered-slot antenna element 112(1) where the transmission-line gap 442 meets the tapered slot 232(1) functions as a first feed 412(1) of the antenna element 112(1). As shown in FIG. 4, the first feed 412(1) is located near the end of the transmission line 410(1) that is opposite to the first output port 404(1) of the second splitter 402. Similarly, the region of the second tapered-slot antenna element 112(2) where the transmission-line gap 444 meets the tapered slot 232(2) forms a second feed 412(2) of the antenna element 112(2). The second feed 412(2) is located near the end of the transmission line 410(2) that is opposite to the second output port 404(2) of the second splitter 402.

Figure 5:
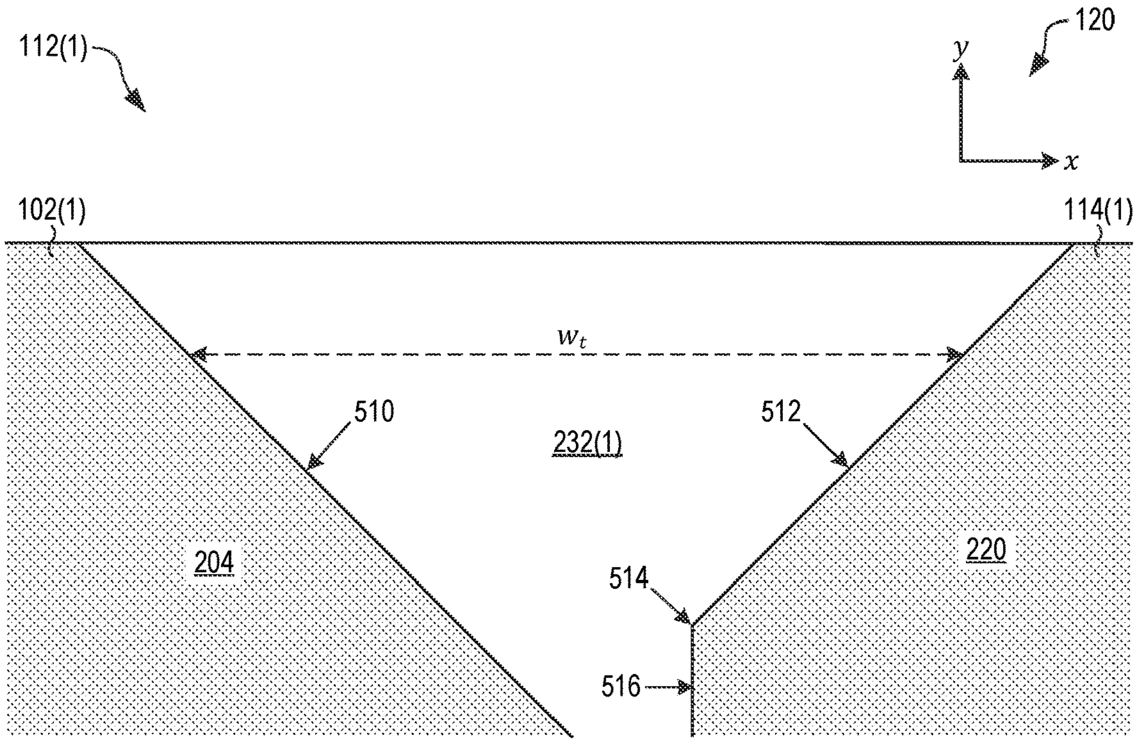
FIG. 5 is an expanded view of a tapered-slot antenna element of the integrated antenna system of FIG. 1.

FIG. 5 is an expanded view of the first tapered-slot antenna element 112(1) of the integrated antenna system 100 of FIG. 1. A first side of the first tapered slot 232(1) is defined by an edge 510 of the radiator sub-patch 204. A second side of the tapered slot 232(1) laterally opposite the first side is defined by edges 512 and 516 of the radiator sub-patch 220. The tapered slot 232(1) has a width $w_t$ that is measured along x between the edge 510 and one of the edges 512 and 516. The slot 232(1) is tapered in that the width $w_t$ increases in the +y direction.

In FIG. 5, the antenna element 112(1) is asymmetric in that it does not exhibit mirror symmetry about a y centerline (i.e., a line that extends parallel to the y axis). Specifically, a vertex 514 formed where the edges 512 and 516 meet creates a "kink" on the second side that does not exist on the first side. Due to this kink, the second side of the tapered slot 232(1) is defined by a piece-wise combination of the linear edges 512 and 516. By comparison, the first side of the tapered slot 232(1) is a simple (i.e., not piece-wise) linear edge.

In another embodiment, the first side of the tapered slot 232(1) is defined by a piece-wise linear edge while the second side of the tapered slot 232(1) is defined by a simple linear edge. One example of this embodiment is the second tapered-slot antenna element 112(2) of FIGS. 1 and 2, which is the mirror image of the first tapered-slot antenna element 112(1). Therefore, for any type of asymmetric antenna element that can be used with the integrated antenna system 100, its mirror image may also be used.

Figure 6:
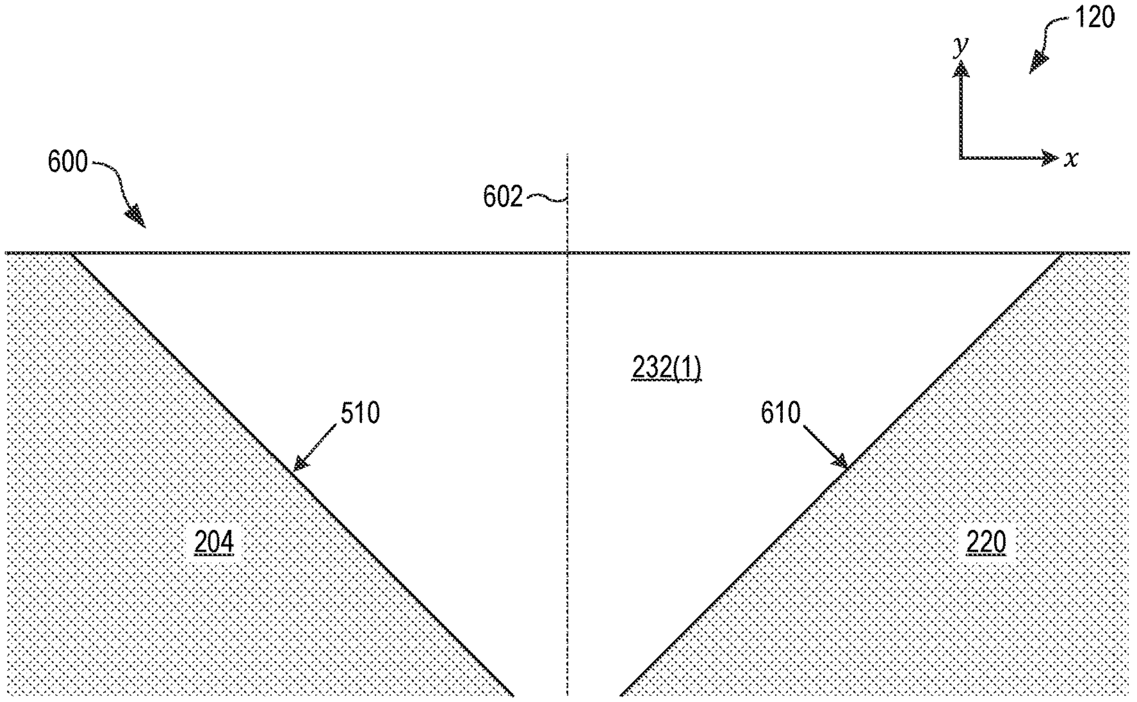
FIG. 6 is a side view of a linear tapered-slot antenna element that may be used with the integrated antenna system of FIG. 1 as an alternative to the tapered-slot antenna element of FIG. 5, in embodiments.

FIG. 6 is a side view of a linear tapered-slot antenna element 600 that may be used with the integrated antenna system 100 of FIG. 1 as an alternative to any one or more of the antenna elements 112 and 122. The antenna element 600 is similar to the first tapered-slot antenna element 112(1) except that the radiator sub-patch 220 is bound by a single linear edge 610. Thus, both sides of the tapered slot 232(1) have no kinks. In FIG. 6, the edge 510 has a first slope $m_1$ in the x-y plane while the edge 610 has a second slope $m_2$ in the x-y that is the negative of the first slope, i.e., $m_2=-m_1$. In this case, the antenna element 600 exhibits mirror symmetry about a y-centerline 602. In other embodiments, the edges 510 and 610 have slopes such that $m_2 \neq -m_1$, in which case the antenna element 600 is asymmetric.

Figure 7:
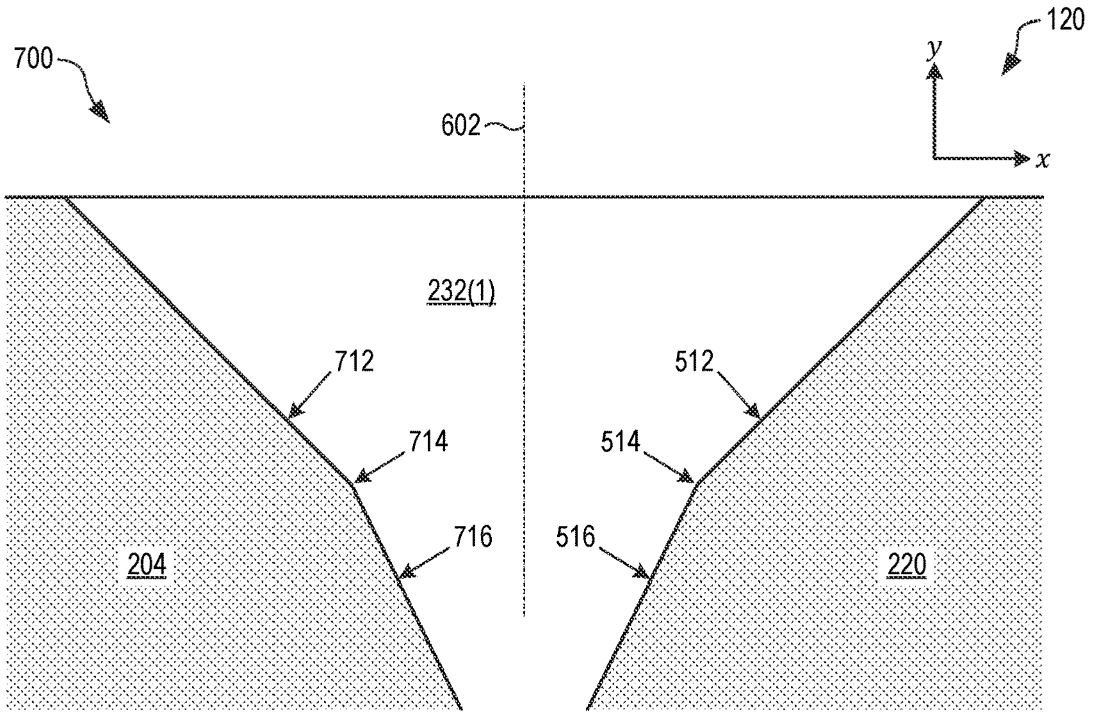
FIG. 7 is a side view of a tapered-slot antenna element that may be used with the integrated antenna system 100 of FIG. 1 as an alternative to the tapered-slot antenna element of FIG. 5, in embodiment.

FIG. 7 is a side view of a tapered-slot antenna element 700 that may be used with the integrated antenna system 100 of FIG. 1 as an alternative to any one or more of the antenna elements 112 and 122. The antenna element 700 is similar to the first tapered-slot antenna element 112(1) except that the first side of the antenna element 700 is also defined by a linear piece-wise edge. Specifically, the radiator sub-patch 204 is bounded by edges 712 and 716 that meet at a vertex 714, thereby forming a kink in the first side of the antenna element 700. In FIG. 7, the edges 512 and 712 exhibit mirror symmetry about the y-centerline 620. Similarly, the edges 516 and 716 exhibit mirror symmetry about the y-centerline 620. In this case, the antenna element 700 is symmetric. In other embodiments, one or more of the edges 512, 516, 712, and 716 have different slopes than shown in FIG. 6. In these embodiments, the antenna element 700 is asymmetric. In other embodiments, one or both of the first and second sides of the antenna element 700 contains more than more kink.

Figure 8:
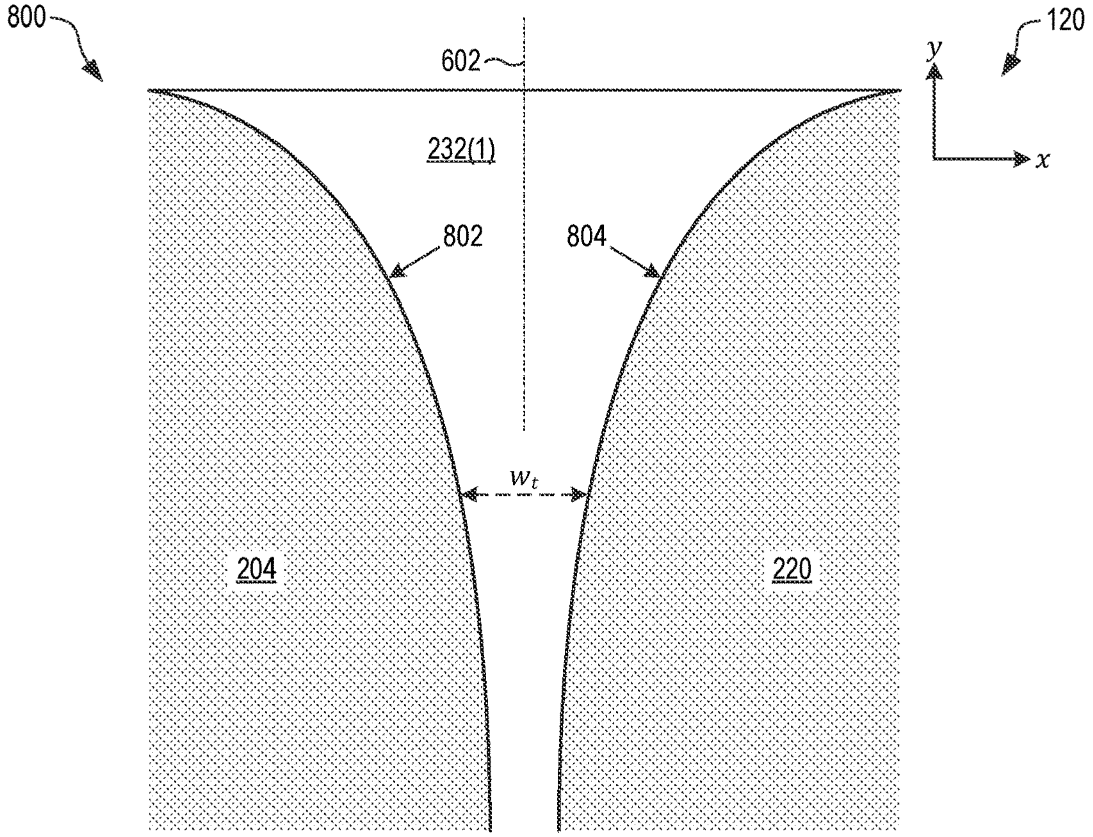
FIG. 8 is a side view of a Vivaldi antenna element that may be used with the integrated antenna system of FIG. 1 as an alternative to the tapered-slot antenna element of FIG. 5, in embodiments.

FIG. 8 is a side view of a Vivaldi antenna element 800 that may be used with the integrated antenna system 100 of FIG. 1 as an alternative to any one or more of the antenna elements 112 and 122. The Vivaldi antenna element 800 is similar to the linear tapered-slot antenna element 600 of FIG. 6 except that the radiator sub-patch 204 is bound by a curved edge 802 and the radiator sub-patch 220 is bound by a curved edge 804. In FIG. 8, the curved edges 802 and 804 vary exponentially, in which case the width $w_t$ of the tapered slot 232(1) increases exponentially in the +y direction. However, the edges 802 and 804 may alternatively be shaped as a different type of curve. Also in FIG. 8, the curved edges 802 and 804 exhibit mirror symmetry about the y-centerline 602. In this case, the Vivaldi antenna element 800 is symmetric. In other embodiments, the edges 802 and 804 do not exhibit mirror symmetry about the y-centerline 602, in which case the Vivaldi antenna element 800 is asymmetric. In other embodiments, one or both of the edges 802 and 804 is linear or a piece-wise combination of linear and curved segments.

Figure 9:
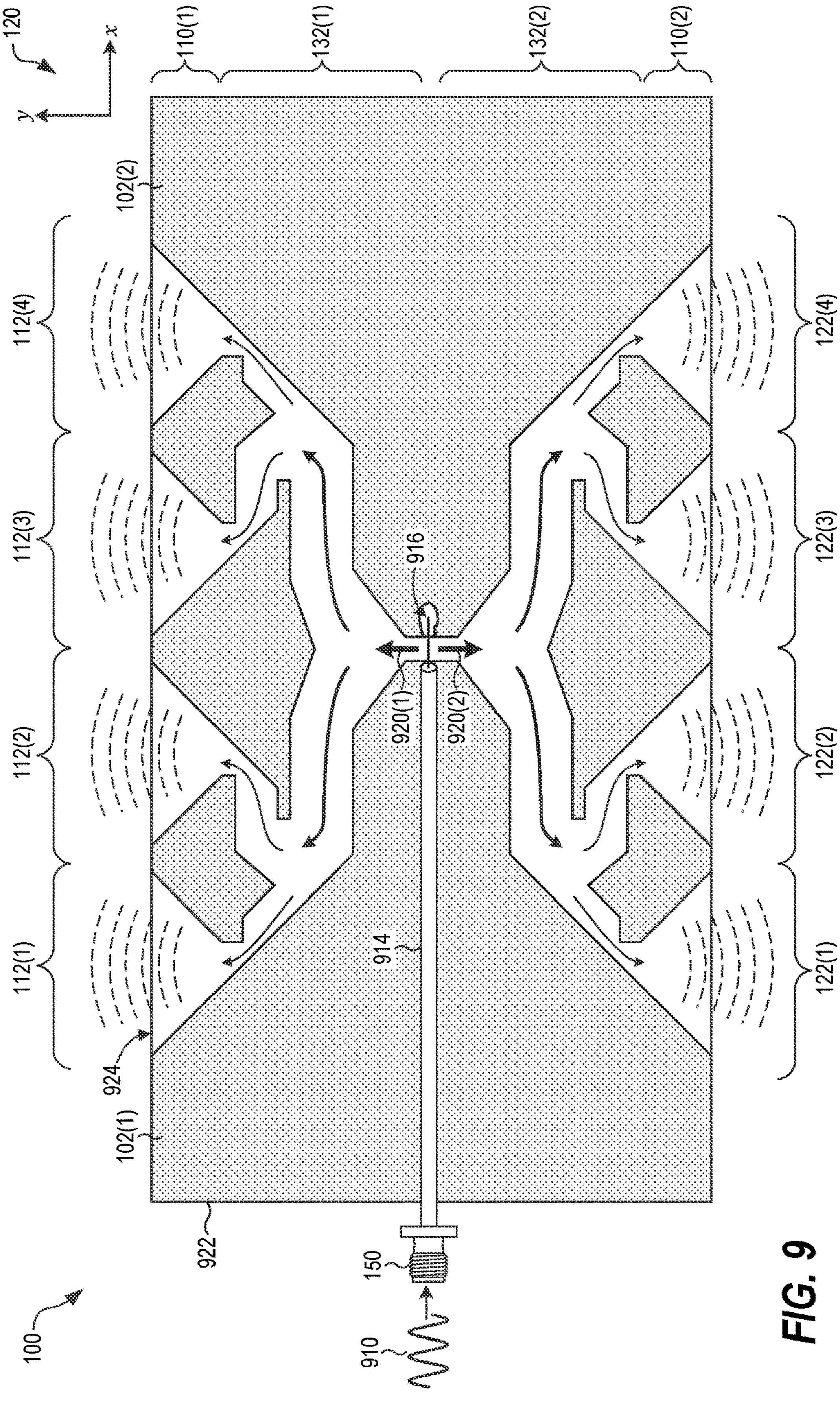
FIG. 9 is a side view of the integrated antenna system of FIG. 1 that illustrates how corporate feed networks and antenna arrays of the integrated antenna system operate in transmission.

FIG. 9 is a side view of the integrated antenna system 100 of FIG. 1 that illustrates how the integrated antenna system 100 operates in transmission. An input signal 910 is fed into the antenna system 100 via the feed 150. In FIG. 5, the feed 150 includes a rigid or semi-rigid coaxial cable 914 that extends along x and is directly soldered to the feed-network sub-patch 208 of the first patch 102(1). The center conductor 916 of the coaxial cable 914 perpendicularly crosses the initial transmission-line gap 240, where it is directly soldered to the feed-network sub-patch 214 of the second patch 102(2). This configuration of the coaxial cable implements a coaxial-to-slotline coupler that excites the initial transmission line 140 with the input signal 910. The input signal 910, after coupled into the initial transmission line 140, propagates away from the coupler center conductor 916, in both the Ly directions, as a first coupled signal 920(1) and a second coupled signal 920(2).

In another embodiment, the integrated antenna system 100 is formed on one side of a printed circuit board. On a different layer of the printed circuit board, the feed 150 includes a microstrip transmission line instead of the coaxial cable 914. The microstrip transmission line extends along x, perpendicularly crossing the initial transmission-line gap 240. The microstrip transmission line may be terminated with a short or stub (e.g., a radial stub). Alternatively, a via through the printed circuit board may be used to electrically connect the microstrip transmission line to the feed-network sub-patch 214 of the second patch 102(2). In either of these cases, the microstrip transmission line implements a microstrip-to-slotline coupler. In other embodiments, the feed 150 includes a different type of planar transmission line. In these other embodiments, the planar transmission line and antenna system 100 may be changed accordingly to implement a coupler that works with the type of planar transmission line of the feed 150 and the type of the initial transmission line 140.

FIG. 9 shows how the first corporate feed network 132(1) iteratively splits the first coupled signal 920(1) into various signals that feed the tapered-slot antenna elements 112(1)-112(4). Similarly, FIG. 9 shows how the second corporate feed network 132(2) iteratively splits the second coupled signal 920(2) into various signals that feed the tapered-slot antenna elements 122(1)-122(4). Each of the antenna elements 112 independently radiates in the +y direction while each of the antenna elements 122 independently radiates in the −y direction. Here, "independently" means without interference for coupling from other antenna elements. With coupling between elements, the first antenna array 110(1) may act like a phased array that radiates primarily in a direction other +y. The same is true for the antenna elements 122 and the second antenna array 110(2).

As mentioned above, the integrated antenna system 100 may be fabricated on a printed circuit board 922. In this case, each of the tapered slots (e.g., tapered slots 232(1)-232(4)) may be bound by an edge 924 of the printed circuit board 922, as illustrated in FIG. 9. Note that the edge 924 also bounds the patches 102, 114, and 124 (see FIG. 1). In other embodiments, the integrated antenna system 100 is fabricated on a larger circuit board that contains additional components. In these embodiments, one or more of the tapered slots may not be bounded by the edge 924.

Figure 10:
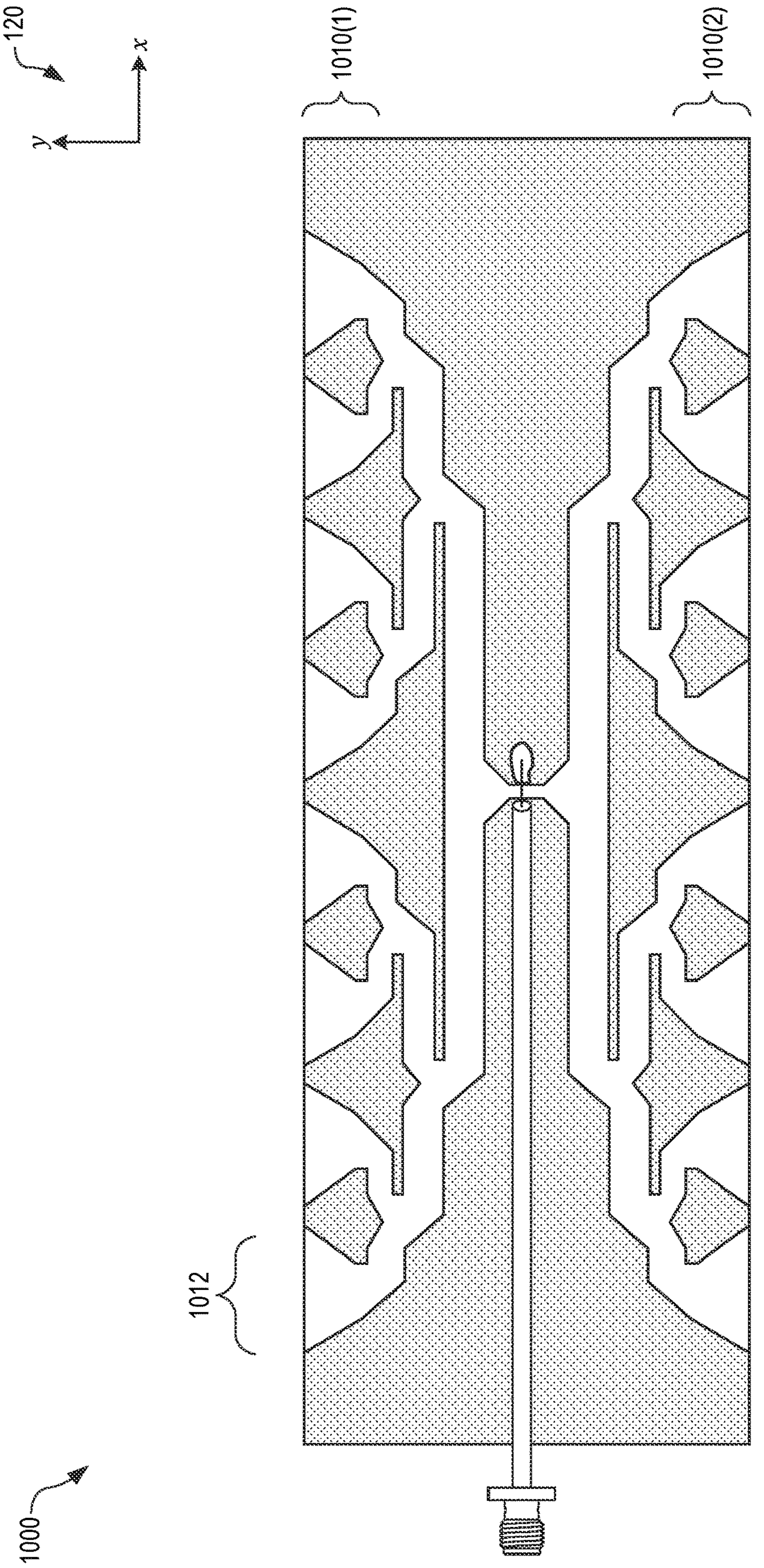
FIG. 10 is a side view of an integrated antenna system that is similar to the integrated antenna system of FIG. 1 except that it contains additional tapered-slot antenna elements, in embodiments.

FIG. 10 is a side view of an integrated antenna system 1000 that is similar to the integrated antenna system 100 of FIG. 1 except that it contains additional tapered-slot antenna elements. Specifically, the antenna system 1000 has a first antenna array 1010(1) and a second antenna array 1010(2), each with eight antenna elements 1012. The antenna system 1000, as compared to the antenna system 100, shows how the present embodiments can be modified to have more or fewer antenna elements. For example, any of the corporate feed networks herein can be configured as a binary tree with $2^n$ antenna elements (e.g., 2, 4, 8, 16, 32, etc.) where n represents the number of levels of the binary tree. Using the first corporate feed network 132(1) of FIG. 1 as an example, the first splitter 302 and transmission lines 310(1) and 320(2) form a first level of the binary tree, the second splitter 302 and transmission line 410(1) and 420(2) are part of a second level of the binary tree, and so on. The antenna elements 112 serve as leaf nodes of the binary tree. Thus, n=2 for each of the corporate feed networks 132(1) and 132(2) of FIG. 1 while n=3 for each of the corporate feed networks shown in FIG. 10.

Even more generally, it is not necessary that the number of antenna elements in an antenna array be a power of 2. For example, each corporate feed network can be configured such that one or more of its binary-tree levels are only partially filled. In this case, the corporate feed network can be used to feed any number of two or more antenna elements.

It is also not necessary that all of the power splitters be 50:50 splitters. Furthermore, it is not necessary that all of the transmission lines within each level of the binary tree have the same length, and therefore the same propagation time. Rather, any corporate feed network herein can be configured with different power splits and time delays such that each antenna element is driven with a unique power and phase. In this manner, each antenna array functions as a phased array that is driven such that it emits a beam that propagates away from the antenna system in a fixed direction that is determined by the powers and phases of the antenna elements.

The integrated antenna systems of the present embodiments may exhibit various mirror symmetries. For example, in FIG. 1 the patches 102, 114, and 124 exhibit mirror symmetry about a y-centerline that passes through the middle of the initial transmission line 140, thereby dividing the antenna system 100 into left and right halves. However, when the antenna elements are driven with different phases and amplitudes, such mirror symmetries may no longer exist. Accordingly, it should be understood that these mirror symmetries are not necessary.

In the integrated antenna system 100 of FIG. 1, the first antenna array 110(1) is linear in that the antenna elements 112 are located along a straight line. The same is true for the second antenna array 110(2). In other embodiments, one or both of the antenna arrays 110(1) and 110(2) are not linear. For example, the first antenna array 110(1) may be curved. In this case, the antenna elements 112 do not all radiate in the same direction, but rather radiate in a direction that depends on its location in the array. In one example of curved antenna arrays, the antenna elements 112 are located along a first hemisphere while the antenna elements 122 are located a second hemisphere that complements the first hemisphere. Thus, the first and second antenna arrays form a circle that circumscribes the corporate feed networks 132(1) and 132(2).

Figure 11:
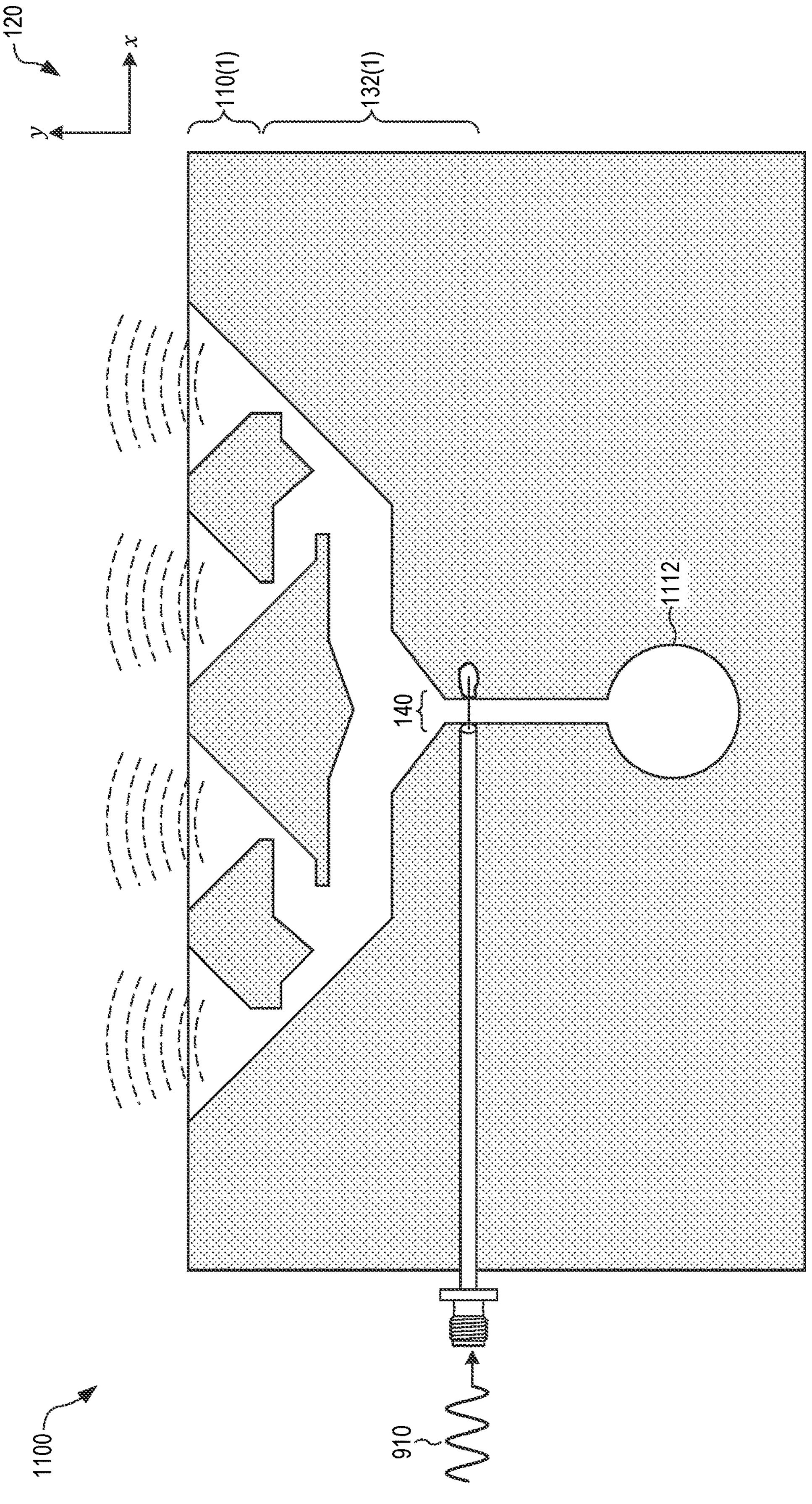
FIG. 11 is a side view of an integrated antenna system that is similar to the integrated antenna system of FIG. 1 except that it has only one antenna array and one corporate feed network, in an embodiment.

FIG. 11 is a side view of an integrated antenna system 1100 that is similar to the integrated antenna system 100 of FIG. 1 except that it has only the first antenna array 110(1) and first corporate feed network 132(1). FIG. 11 illustrates that the present embodiments need not operate with two antenna arrays and two corporate feed networks. In FIG. 11, the initial transmission line 140 has a first end that feeds the first corporate feed network 132(1) and a second end that is opposite to the first end. Near the second end is a planar quarter-wave cavity stub 1112 that terminates the second end of the initial transmission line. The cavity stub 1112 provides a high impedance so that drive currents induced by the input signal 910 flow upward into the corporate feed network 132(1). Thus, for equal powers of the input signal 910, the first antenna array 110(1) will radiate twice as much power in FIG. 11 as in FIG. 9.

Demonstration

As a demonstration of the present embodiments, a prototype of the integrated antenna system 100 of FIG. 1 was fabricated and tested in a 50-foot anechoic chamber. The prototype was oriented vertically such that it emitted vertically-polarized radiation (i.e., gravity pointed in the −x direction, using the coordinate system 120 of FIG. 1). The prototype was mounted on a 4-foot rolled-edge ground plane.

Figure 12:
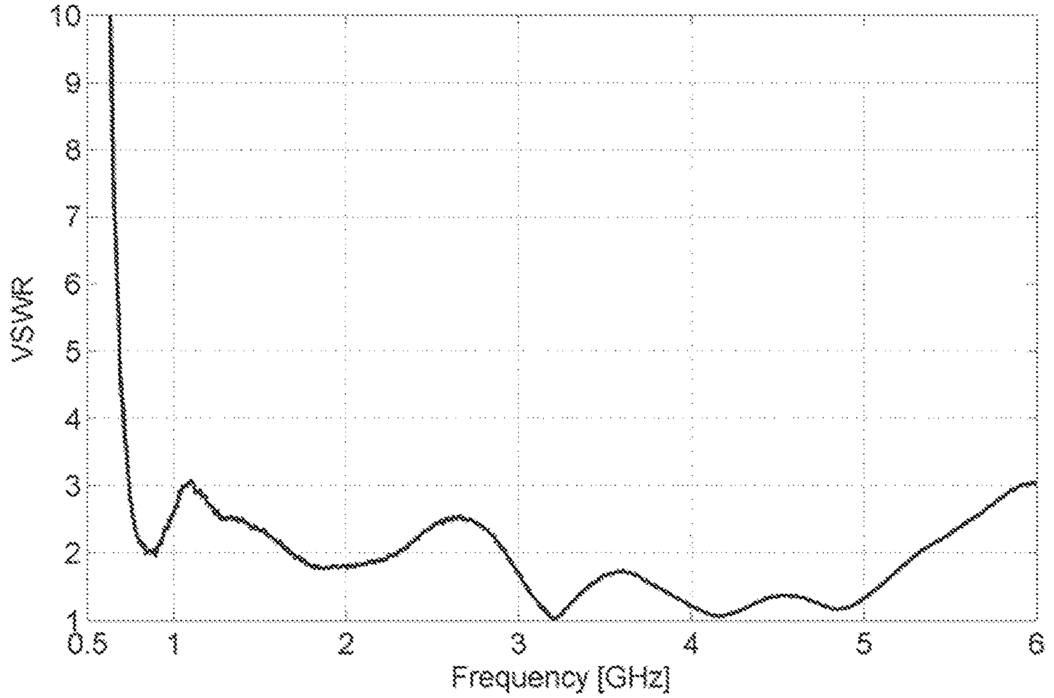
FIG. 12 is a plot of voltage standing-wave ratio (VSWR) versus frequency, as measured with a prototype of the integrated antenna system of FIG. 1.

FIG. 12 is a plot of voltage standing-wave ratio (VSWR) versus frequency, as measured with the prototype. The VSWR is less than 3.1:1 from approximately 750 MHz to at least 6 GHz, a clear indication of the high electrical efficiency of the prototype.

Figure 13:
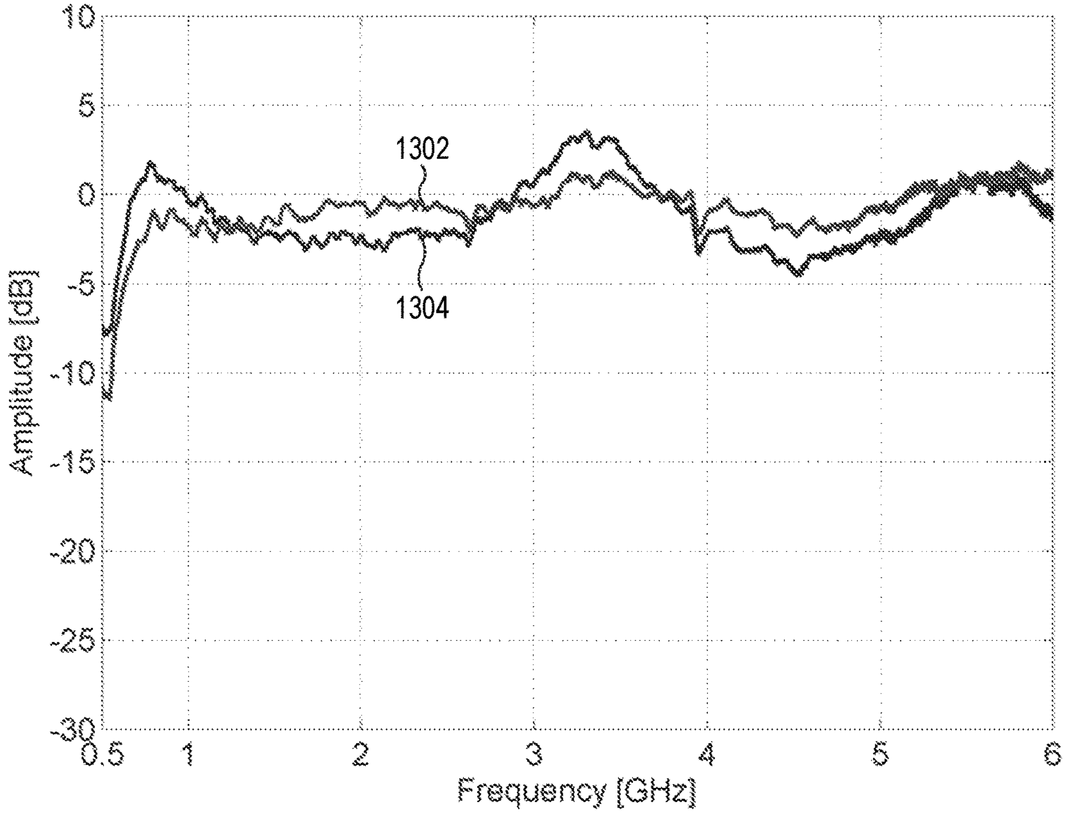
FIG. 13 is a plot of gain versus frequency, as measured with the prototype.

FIG. 13 is a plot of gain versus frequency, as measured with the prototype. The curve 1302 is the gain at an elevation angle of 0° while the curve 1304 is the gain at an elevation angle of 45°. As described below, the variation of the gain with azimuthal angle is negligible. FIG. 13 illustrates that the prototype has high gain from approximately 700 MHz to at least 6 GHz. Furthermore, the prototype has sufficient gain to maintain good coverage along the horizon (i.e., elevation angle of) 0° and out to elevation angles of at least ±45°.

Figure 15:
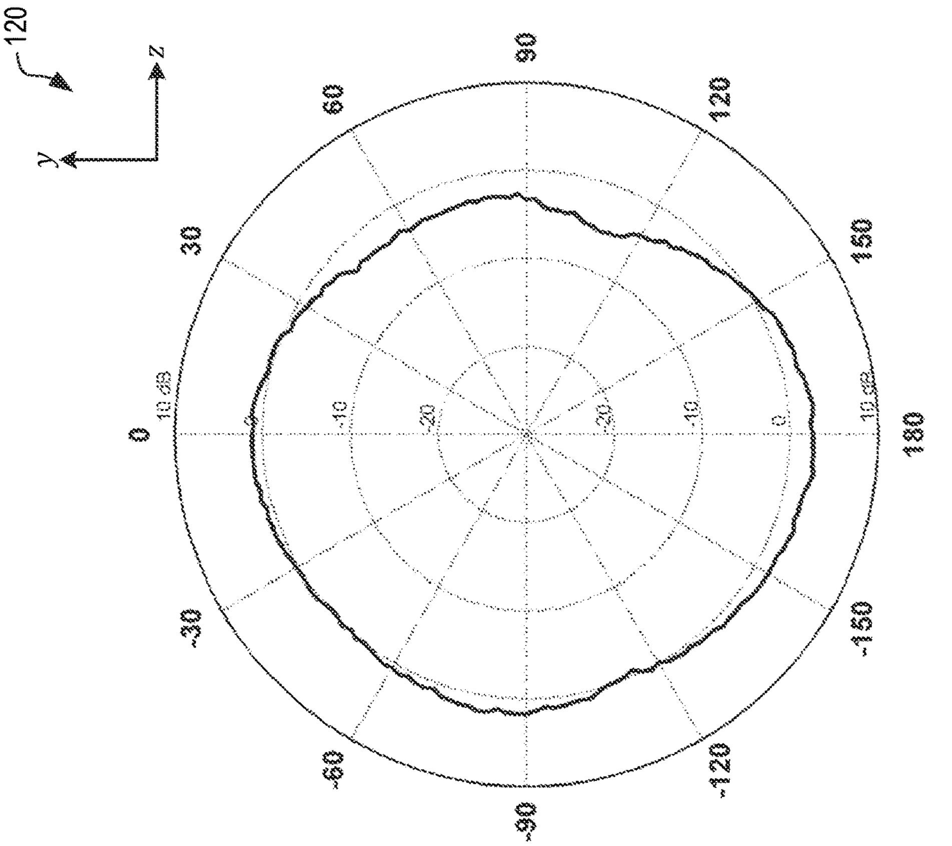
FIG. 15 is an azimuthal cut measured with the prototype at an elevation angle of 0° and a frequency of 6.0 GHz.
Figure 14:
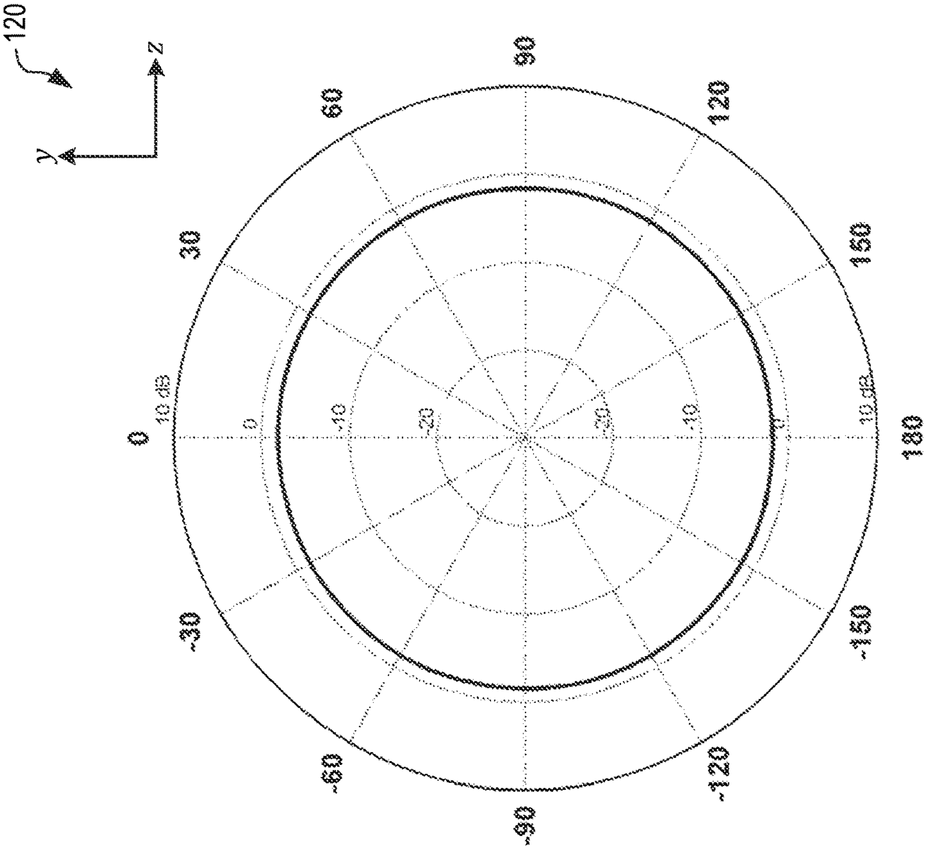
FIG. 14 is an azimuthal cut measured with the prototype at an elevation angle of 0° and a frequency of 1.0 GHz.

FIGS. 14 and 15 are azimuthal cuts measured with the prototype at an elevation angle of 0° and frequencies of 1.0 GHz and 6.0 GHz, respectively. FIGS. 14 and 15 show that the antenna gain is exceptionally uniform for all azimuthal angles, especially at lower frequencies.

Figure 17:
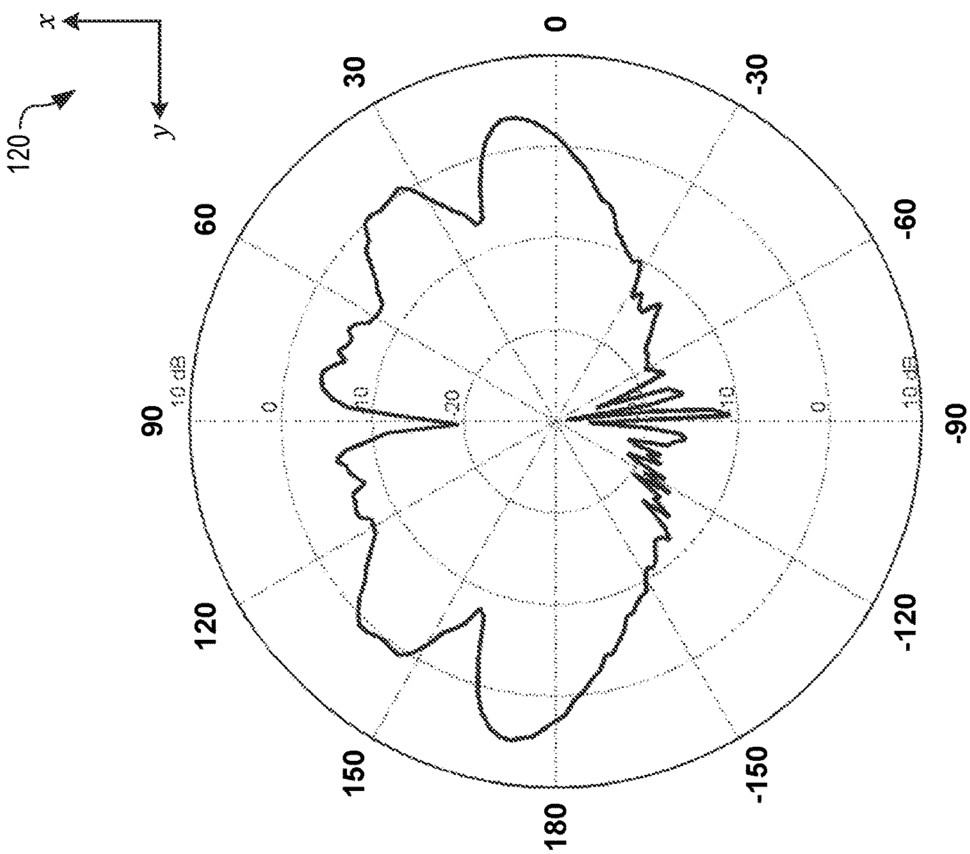
FIG. 17 is an elevation cut measured with the prototype at an azimuthal angle of 0° and frequency of 6.0 GHz.
Figure 16:
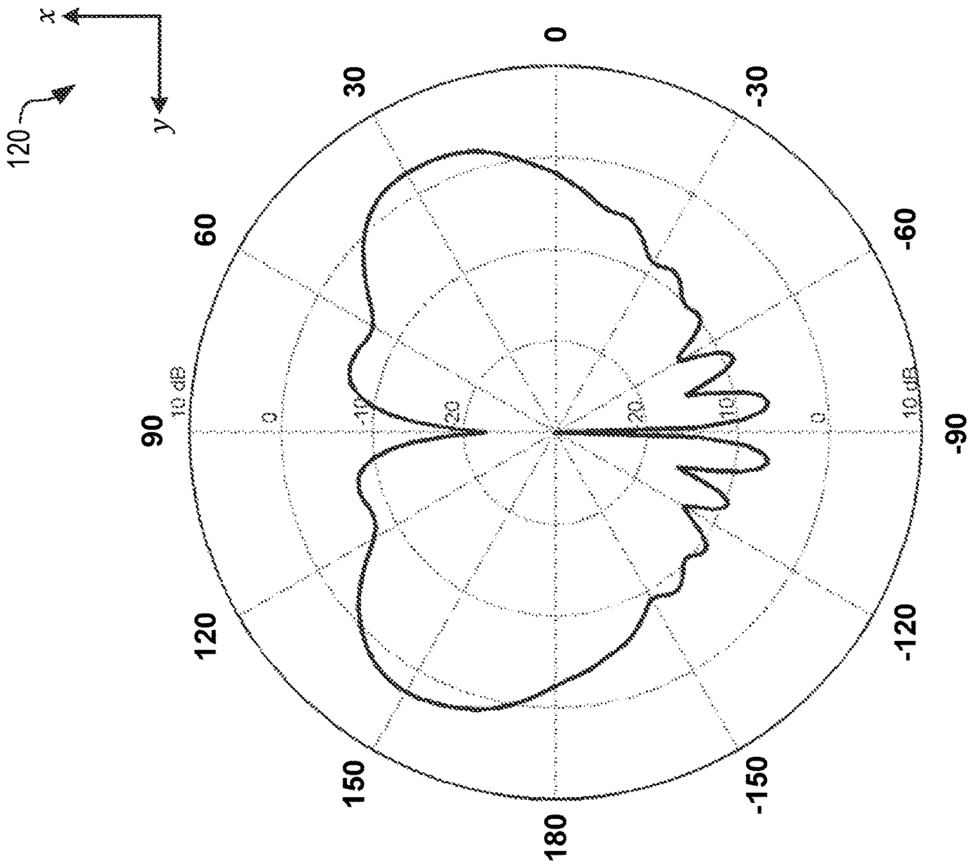
FIG. 16 is an elevation cut measured with the prototype at an azimuthal angle of 0° and frequency of 1.0 GHz.

FIGS. 16 and 17 are elevations cuts measured with the prototype at an azimuthal angle of 0° and frequencies of 1.0 GHz and 6.0 GHz, respectively. FIGS. 16 and 17 show that the gain is highest along the horizon and low elevation angles. The gain rolls off with increasing elevation angle to form a null at 90° (i.e., in the vertical direction). The gain also rolls off when crossing the horizon toward negative elevation angles, an effect attributed to the ground plane.

The data shown in FIGS. 12-17 was obtained with no radome over the prototype. The measurements shown in FIGS. 12-17 were repeated with a blade-shaped radome covering the prototype. Although not shown in the present figures, the radome had a negligible effect on the VSWR and low-frequency gain. At frequencies approaching 6 GHz, the radome introduced only mild degradation of the gain pattern. As known in the art, one or both of the integrated antenna system 100 and radome can be designed to compensate for this degradation (e.g., using computer modeling software).

Figure 18:
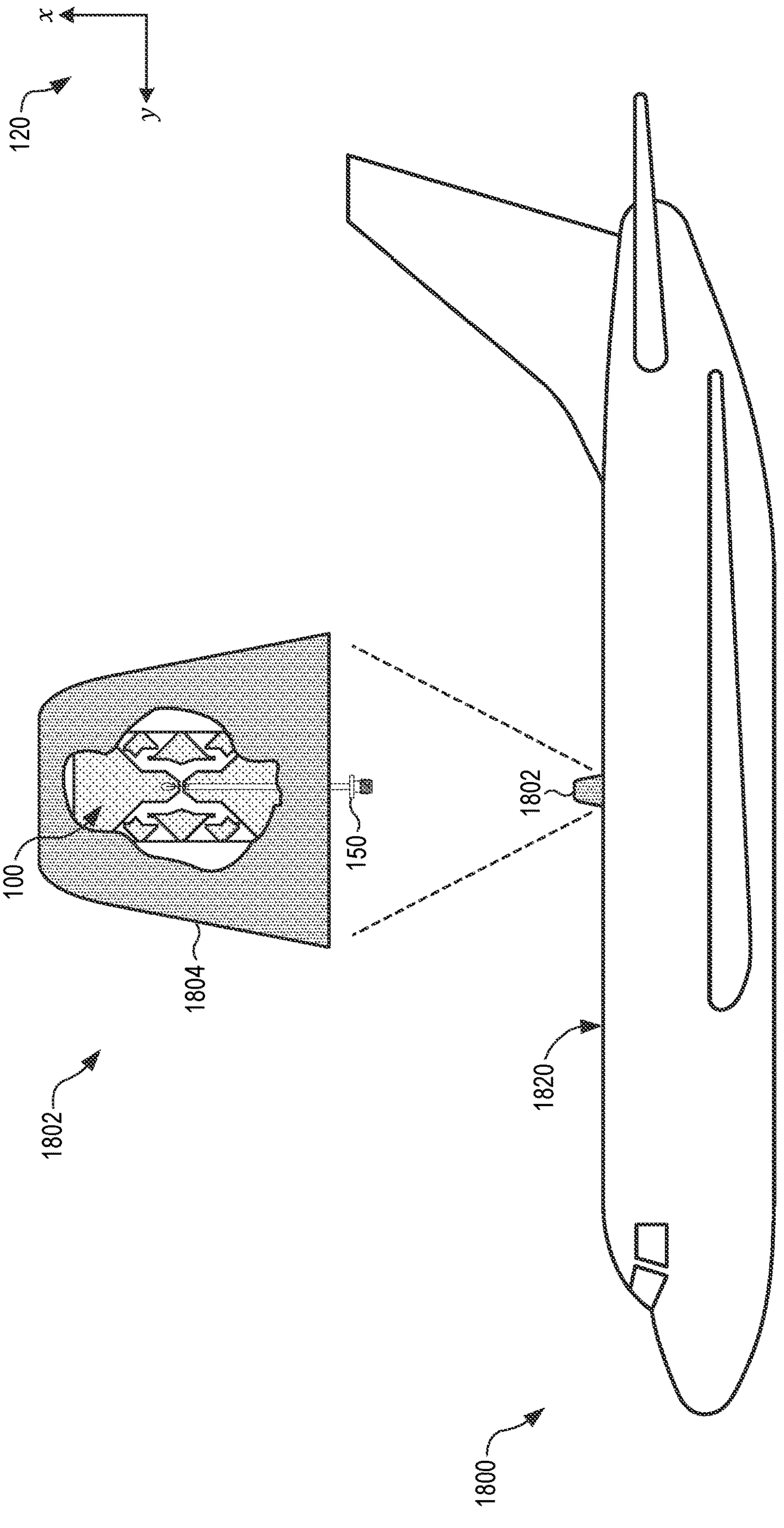
FIG. 18 is a side view of a blade antenna system mounted to the top of a fuselage of an aircraft, in embodiments.

FIG. 18 is a side view of a blade antenna system 1802 mounted to the top of a fuselage 1820 of an aircraft 1800. The blade antenna system 1802 includes an integrated antenna system of the present embodiments (e.g., the integrated antenna system 100 of FIG. 1) with a blade-shaped radome 1804 that surrounds the integrated antenna system. FIG. 18 also shows an expanded view of the blade antenna system 1802 with a portion of the radome 1804 removed so that the integrated antenna system 100 can be viewed. As can be seen in this expanded view, the integrated antenna system 100 is oriented such that first antenna array 110(1) emits in the forward direction of the aircraft 1800 (i.e., the +y direction) while the second antenna array 110(2) emits in the reverse direction (i.e., the −y direction). Alternatively, the integrated antenna system 100 may be mounted inside the radome 1804 such that the first antenna array 110(1) emits in the backward direction while the second antenna array 110(2) emits in the forward direction. In either case, the feed 150 extends vertically downward to enter the fuselage 1820, where it connects to a transceiver.

While FIG. 18 shows the blade antenna system 1802 extending vertically upward (i.e., in the +x direction) from the top of fuselage 1820, the blade antenna system 1802 may alternatively be affixed to another part of the aircraft 1800 (e.g., a wing). The blade antenna system 1802 may alternatively be mounted such that it extends vertically downward from the bottom of the fuselage 1820 or another part of the aircraft 1800.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. An integrated antenna system, comprising:

a first patch, a second patch, and one or more internal patches comprising electrically conductive material, each of the first patch, second patch, and one or more internal patches having a radiator sub-patch and a feed-network sub-patch;

wherein:

the first patch, second patch, and one or more internal patches are co-planar;

the one or more radiator sub-patches of the one or more internal patches are located between the radiator sub-patches of the first and second patches to form an array of tapered-slot antenna elements;

the radiator sub-patch of each internal patch, of the one or more internal patches, tightly couples a neighboring pair of the tapered-slot antenna elements;

the first patch, second patch, and one or more internal patches are electrically isolated from each other;

the radiator sub-patches of the first patch, second patch, and one or more internal patches have no spatial overlap;

the feed-network sub-patches of the first and second patches are positioned to form an initial gap therebetween and cooperate with the initial gap to create an initial transmission line; and the feed-network sub-patches of the first patch, second patch, and one or more internal patches further form a corporate feed network that is fed by the initial transmission line and feeds the array of tapered-slot antenna elements.

2. The integrated antenna system of claim 1, wherein the initial transmission line is a planar transmission line.

3. The integrated antenna system of claim 2, wherein the planar transmission line is a slotline-based transmission line.

4. The integrated antenna system of claim 1, wherein:

the one or more internal patches include a third patch;

the feed-network sub-patches of the first and third patches form a first gap therebetween that is continuous with the initial gap, the feed-network sub-patches of the first and third patches cooperating with the first gap to create a first transmission line, of the corporate feed network, that is split from the initial transmission line; and the feed-network sub-patches of the second and third patches form a second gap therebetween that is continuous with the initial gap and the first gap, the feed-network sub-patches of the second and third patches cooperating with the second gap to create a second transmission line, of the corporate feed network, that is split from the initial transmission line.

5. The integrated antenna system of claim 4, wherein each of the initial transmission line, first transmission line, and second transmission line is a slotline-based transmission line.

6. The integrated antenna system of claim 4, wherein:

the radiator sub-patches of the first and third patches form a first tapered-slot antenna, of the array of tapered-slot antenna elements, that is fed by the first transmission line; and the radiator sub-patches of the second and third patches form a second tapered-slot antenna, of the array of tapered-slot antenna elements, that is fed by the second transmission line.

7. The integrated antenna system of claim 4, wherein each of a first width of the first gap and a second width of the second gap is greater than an initial width of the initial gap.

8. The integrated antenna system of claim 4, wherein:

the one or more internal patches further include a fourth patch and a fifth patch;

the feed-network sub-patches of the first and fourth patches forms a third gap therebetween that is continuous with the first gap, the feed-network sub-patches of the first and fourth patches cooperating with the third gap to create a third transmission line, of the corporate feed network, that is split from the first transmission line;

the feed-network sub-patches of the third and fourth patches form a fourth gap therebetween that is continuous with the first and third gaps, the feed-network sub-patches of the third and fourth patches cooperating with the fourth gap to create a fourth transmission line, of the corporate feed network, that is split from the first transmission line;

the feed-network sub-patches of the third and fifth patches form a fifth gap therebetween that is continuous with the second gap, the feed-network sub-patches of the third and fifth patches cooperating with the fifth gap to create a fifth transmission line, of the corporate feed network, that is split from the second transmission line; and the feed-network sub-patches of the second and fifth patches form a sixth gap therebetween that is continuous with the second and fifth gaps, the feed-network sub-patches of the second and fifth patches cooperating with the sixth gap to create a sixth transmission line, of the corporate feed network, that is split from the second transmission line.

9. The integrated antenna system of claim 8, wherein each of the initial transmission line, first transmission line, second transmission line, third transmission line, fourth transmission line, fifth transmission line, and sixth transmission line is a slotline-based transmission line.

10. The integrated antenna system of claim 8, wherein:

the radiator sub-patches of the first and fourth patches form a first tapered-slot antenna, of the array of tapered-slot antenna elements, that is fed by the third transmission line;

the radiator sub-patches of the third and fourth patches form a second tapered-slot antenna, of the array of tapered-slot antenna elements, that is fed by the fourth transmission line;

the radiator sub-patches of the third and fifth patches form a third tapered-slot antenna, of the array of tapered-slot antenna elements, that is fed by the fifth transmission line; and the radiator sub-patches of the second and fifth patches form a fourth tapered-slot antenna, of the array of tapered-slot antenna elements, that is fed by the sixth transmission line.

11. The integrated antenna system of claim 1, the first patch, second patch, and one or more internal patches being parallel to each other.

12. The integrated antenna system of claim 1, the first and second patches exhibiting mirror symmetry about a center-line of the initial gap.

13. The integrated antenna system of claim 12, the one or more internal patches exhibiting mirror symmetry about the centerline of the initial gap.

14. The integrated antenna system of claim 12, the first and second patches forming a cavity stub located at an end of the initial transmission line that is opposite to the corporate feed network.

15. The integrated antenna system of claim 1, feed-network sub-patches of the first and second patches being parallel to each other and perpendicularly displaced from each other such that the initial transmission line is an antipodal slotline transmission line.

16. The integrated antenna system of claim 1, the array of tapered-slot antenna elements being oriented to emit in the same direction.

17. The integrated antenna system of claim 1, the electrically conductive material comprising metal.

18. The integrated antenna system of claim 1, wherein:

the integrated antenna system further comprises an electrically insulating substrate; and the first patch, second patch, and one or more internal patches are adhered to the electrically insulating substrate.

19. The integrated antenna system of claim 18, the array of tapered-slot antenna elements being laterally bounded by an edge of the electrically insulating substrate.

20. The integrated antenna system of claim 1, wherein:

the initial transmission line is a slotline-based transmission line; and the integrated antenna system further comprises a slotline coupler that perpendicularly crosses the slotline-based transmission line.

21. The integrated antenna system of claim 20, the slotline coupler comprising a coaxial cable having a center conductor that perpendicularly crosses the slotline-based transmission line.

22. The integrated antenna system of claim 20, wherein:

the first patch, second patch, and one or more internal patches are all located on a first layer of a circuit board;

the slotline coupler comprises a microstrip transmission line that is located on a second layer of the circuit board that is different from the first layer; and the circuit board forms a via that electrically connects an end of the microstrip transmission line to either the first patch or the second patch.

23. A dual integrated antenna system comprising:

a first antenna system forming a first antenna array of tapered-slot antenna elements, a first corporate feed network that feeds the first antenna array, and a first transmission-line segment extending between a first end and a second end, the first end feeding the first corporate feed network, the first antenna system comprising a first instance of the integrated antenna system of claim 1;

a second antenna system forming a second antenna array of tapered-slot antenna elements, a second corporate feed network that feeds the second antenna array, and a second transmission-line segment extending between a third end and a fourth end, the third end feeding the second corporate feed network, the second antenna system comprising a second instance of the integrated antenna system of claim 1;

wherein:

the third and fourth ends meet such that the first and second transmission-line segments form a single transmission line; and each internal patch of the first antenna system is electrically isolated from all of the internal patches of the second antenna system.

24. The dual integrated antenna system of claim 23, the single transmission line being a slotline-based transmission line.

25. The dual integrated antenna system of claim 23, the first and second antenna systems being parallel to each other.

26. The dual integrated antenna system of claim 25, the first and second antenna systems being co-planar.

27. The dual integrated antenna system of claim 23, exhibiting mirror symmetry about a centerline of the single transmission line.

28. The dual integrated antenna system of claim 23, exhibiting mirror symmetry about a midline that perpendicularly bisects the single transmission line into the first and second transmission-line segments.

29. The dual integrated antenna system of claim 23, wherein:

the first antenna array is oriented to emit in a first direction; and the second antenna array is oriented to emit in a second direction that is different from the first direction.

30. The dual integrated antenna system of claim 29, the first direction being azimuthally opposite the second direction.

31. A blade antenna system comprising:

the dual integrated antenna system of claim 23 formed on a circuit board; and a conformal housing encasing the circuit board, the conformal housing being configured for attachment to an aircraft.

32. The blade antenna system of claim 31, the conformal housing being shaped as an aircraft fairing.

* * * * *